No. 612,344. Patented Oct. 11, 1898.
C. W. JENKINS.
UNDERGROUND ELECTRIC RAILWAY.
(Application filed Oct. 28, 1897.)
(No Model.) 4 Sheets—Sheet 1.
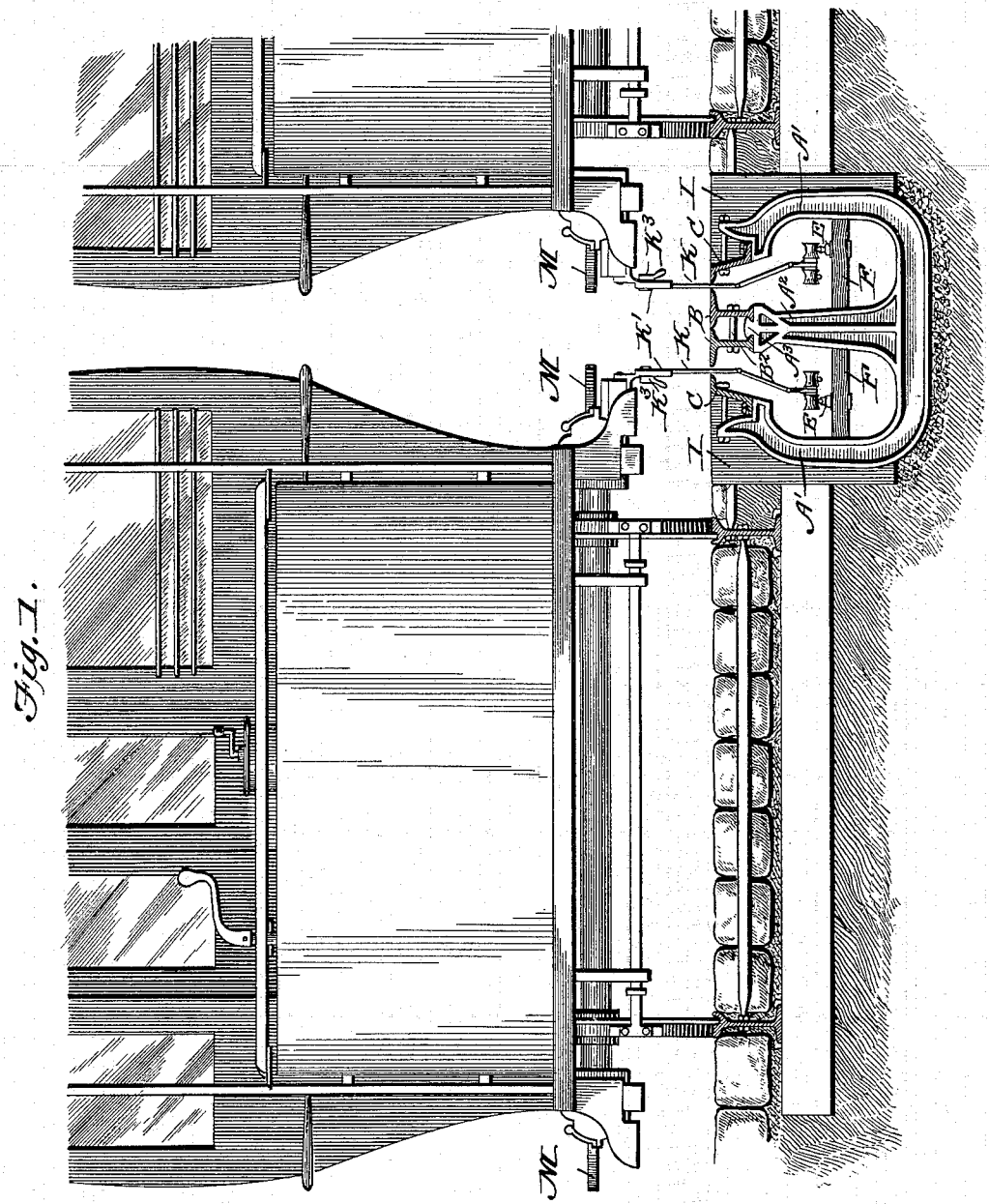
WITNESSES:
M. D. Blondel
P. B. Turpin
INVENTOR
Charles W. Jenkins.
BY Munn & Co.
ATTORNEYS.

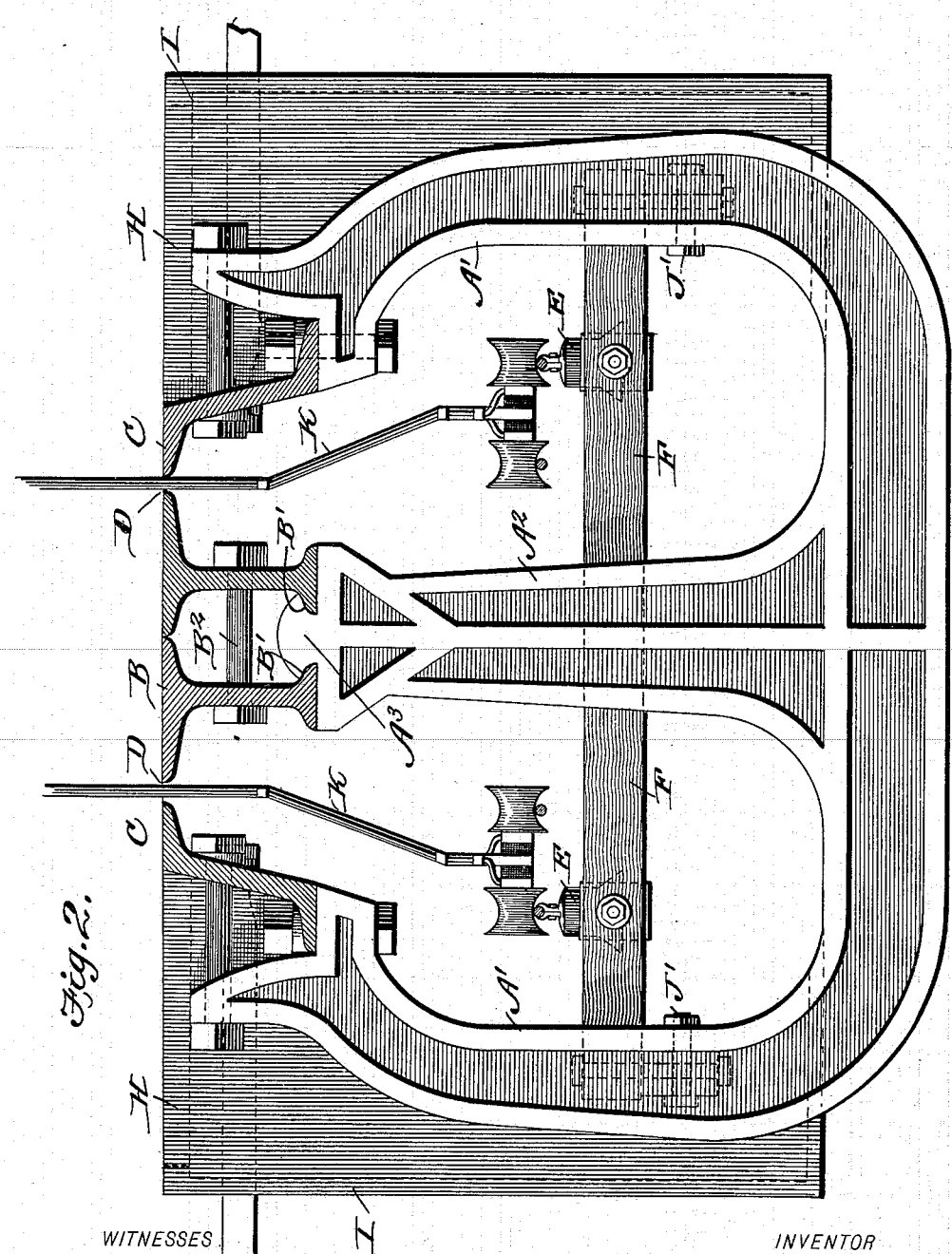

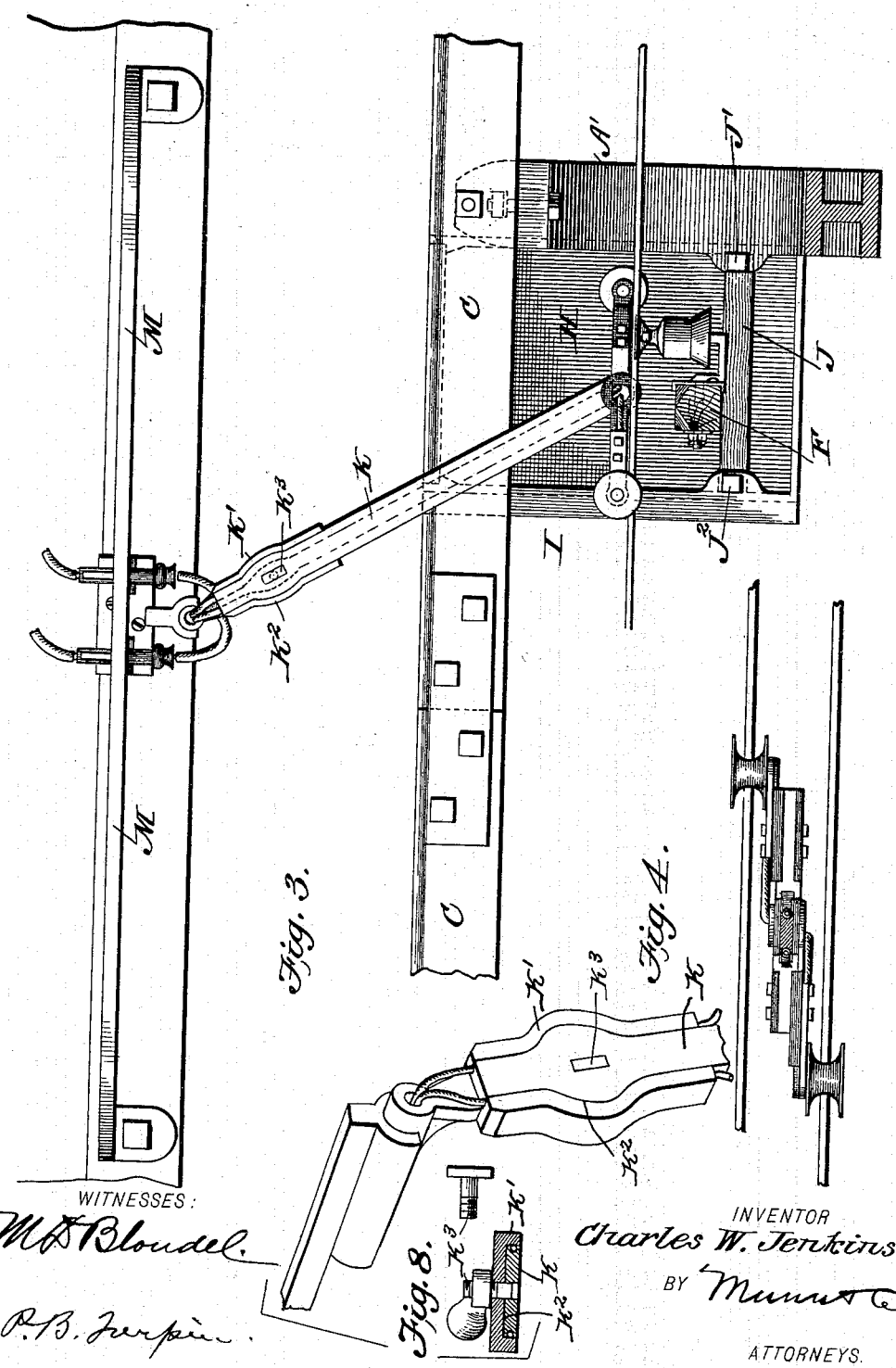

No. 612,344. Patented Oct. 11, 1898.
C. W. JENKINS.
UNDERGROUND ELECTRIC RAILWAY.
(Application filed Oct. 28, 1897.)
(No Model.) 4 Sheets—Sheet 4.
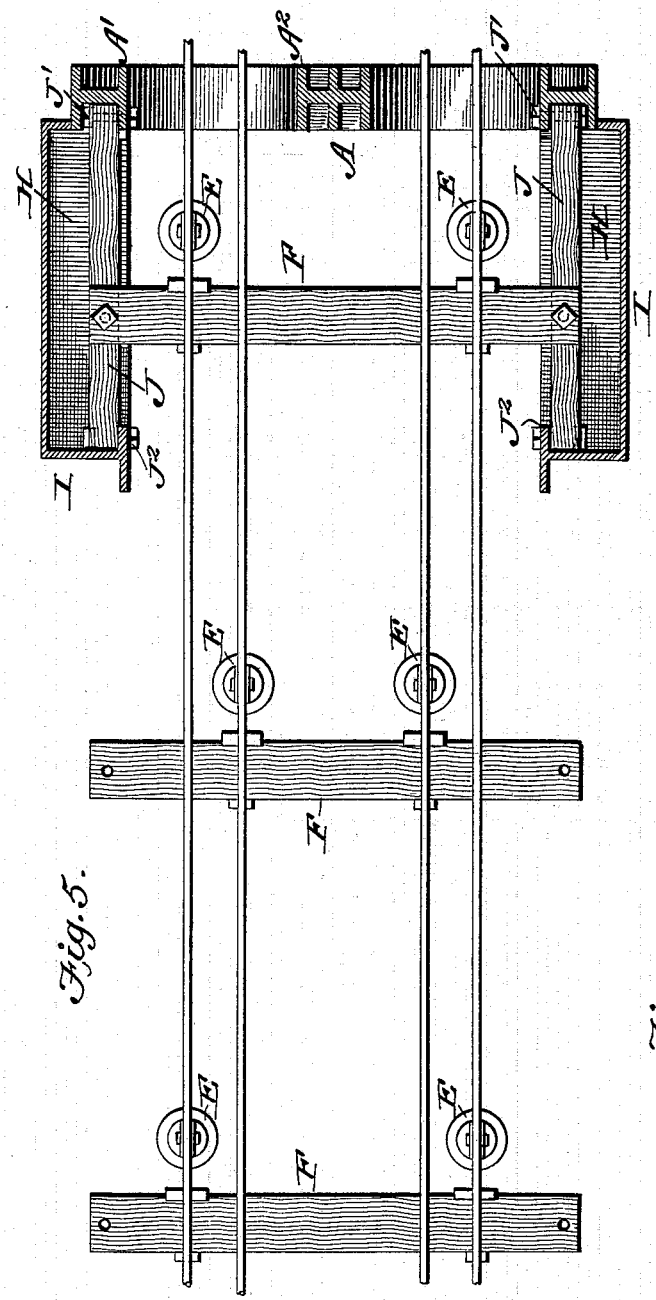
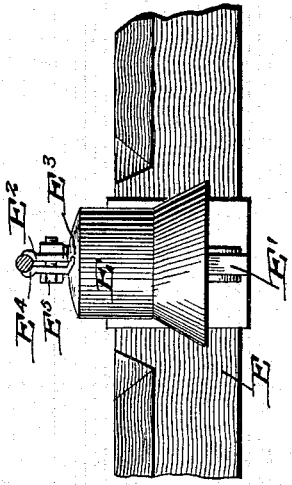
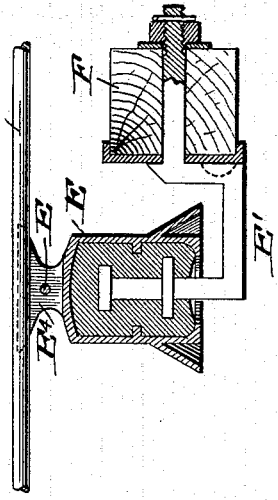
WITNESSES:
M. D. Blondel
P. B. Turpin
INVENTOR
Charles W. Jenkins.
BY Munn & Co.
ATTORNEYS.

UNITED STATES PATENT OFFICE.

CHARLES W. JENKINS, OF RICHMOND, VIRGINIA, ASSIGNOR TO WILTON F. JENKINS, OF SAME PLACE.

UNDERGROUND ELECTRIC RAILWAY.

SPECIFICATION forming part of Letters Patent No. 612,344, dated October 11, 1898.

Application filed October 28, 1897. Serial No. 656,648. (No model.)

*To all whom it may concern:*

Be it known that I, CHARLES W. JENKINS, residing at Richmond, in the county of Henrico and State of Virginia, have invented an Improvement in Underground Electric Railways, of which the following is a full, clear, and exact description.

My invention is an improvement in underground electric railways; and it consists in certain improvements in the conduit and in the drop or underground trolley and in the means for guarding such trolley against damage by a vehicle-wheel, to which ends the invention consists in certain novel constructions and combinations of parts, as will be hereinafter described, and pointed out in the claims.

In the drawings, Figure 1 is a cross-section of a railroad provided with my improvements. Fig. 2 is an enlarged cross-section of the conduit. Fig. 3 is a detail longitudinal section of a part of the conduit. Fig. 4 is a detail view of the trolley, parts being broken away and others shown in section. Fig. 5 is a diagrammatic plan view, partly in section. Figs. 6 and 7 are detail views showing the insulator and the cross-beam, and Fig. 8 represents in detail the connection between the sections of the trolley-shank.

In forming the conduit I employ at suitable intervals yokes A, which have the side arms A' and the post $A^2$, arranged centrally between the side arms A', as shown. At its upper end the post $A^2$ has an undercut head $A^3$, and the slot-plates B have their base portions B' engaged with the head $A^3$ of the post and are connected by a fastening-bolt $B^2$, which holds the plates B together and in engagement with the undercut head of the post. The opposite slot-plates C are secured on the side arm A' of the yoke, as shown, thus forming the slots D, one for each track and communicating with a common conduit, which conduit is arranged between the parallel tracks, so a single conduit is sufficient for both such tracks and is arranged between the same, so any repairs to the conduit will not necessitate tearing up the tracks nor interfere with the movements of cars thereon.

The insulators E are supported on transverse insulating-beams F of wood, being supported from said beams by means of the brackets E', projecting from the side of the beams F, so the insulators may be arranged alongside instead of above the beams. This permits the arrangement of the transverse beams a greater distance from the bottom of the conduit, with the insulators at a given height, than if such insulators were arranged above the beams and is important for such reason.

The insulators E support the conductors G and are provided with seat portions $E^2$, undercut at $E^3$, and with clamp portions $E^4$, fitted to the undercut portion $E^3$ and held by the bolt $E^5$ to clamp the conductors in place.

At the sides of the conduit I provide the hand-holes H, formed by the hand-hole casings I, which latter are secured at one end to the yoke and extend therefrom in the direction of length of the track and permit access to the insulators, as will be understood from the drawings. It will be noticed the ends of the transverse beams terminate opposite the hand-hole, which is convenient in manipulating the insulators supported thereon and is important because thereby the ends of the said transverse beam are spaced apart from the earth at the sides of the casing, thus securing a better insulation, which end is further served by supporting the ends of the transverse beam on the side beams J of wood, to which they are suitably secured at points midway between the ends of the said side beams. These side beams span the hand-holes in the direction of length of the track and are suitably supported at their ends, preferably by securing one end at J' to the yoke and the other end at $J^2$ to the hand-hole casing, the side beam being thus firmly supported and aiding in bracing the yoke and the hand-hole casing in position. It will be noticed that the insulators of the coacting pair of conductors are arranged alternately on the beams, the insulator of the right wire being supported on one beam and that of the left wire on the next beam, and so on.

In practice I brace the conduit and the opposite tracks by a system of connecting-bolts which tie the yokes to the opposite tracks, thus connecting such tracks with the yokes, and thereby with each other, in a manner to prevent any displacement of any of the parts.

The trolleys have their shanks formed in separable sections K and K', which may be detached in case of an accident, so the lower section K may be detached and dropped into the conduit. This connection is preferably effected by forming the sections K' with a laterally-opening recess K², in which the section K is fitted and secured by the clamp K³, consisting of a nut and hand-bolt, as shown in the drawings.

As best shown in Fig. 8, the recess K² is contracted toward its end and the section K is fitted to such recess and is movable laterally into and out of the same, being held from longitudinal movement into and out of the recess K² by the contracted ends thereof, as shown, so no amount of longitudinal stress on the section K will disconnect it from the section K'.

The trolley-shank, it will be noticed, is arranged at the side of the car in what appears to be a somewhat-exposed position. To protect this shank from injury, I provide on the car an overhanging guard M, extended over the trolley-shank and rounded at its ends to deflect a vehicle-wheel that would otherwise strike and injure the trolley-shank.

By the particular arrangement of the insulating transverse and side beams of wood I am able to space the insulators a considerable distance from any point of contact with the earth and reduce to a minimum the loss of power incident to a more direct connection and by the particular arrangement of such beams secure other advantages, as before set forth.

Having thus described my invention, what I claim, and desire to secure by Letters Patent, is—

1. In a conduit for electric railways, the combination with the conduit-framing, of the transverse wooden beams, the insulators thereon, and the wooden side beams connected with and supporting the transverse beam and secured at their ends to the conduit-framing, substantially as described.

2. In a conduit for electric railways, the combination with the transverse beam supporting the insulators, of side beams extended at right angles to the transverse beam and supporting the same between their ends and supports for the ends of the side beams, substantially as described.

3. In a conduit for electric railways, the combination with the transverse beam supporting the insulators, of side beams supporting the ends of the transverse beam and the hand-hole casings arranged opposite the ends of the transverse beam whereby such ends are spaced from the earth, substantially as described.

4. In a conduit, the combination with the yoke and the hand-hole casing arranged at one end adjacent to and extending in the direction of length of the railway forming said conduit, the side beams secured at one end to the yoke and at their other ends to the hand-hole casing and the transverse beam supported at its ends on the side beams midway the ends of the latter, substantially as described.

5. A conduit for electric railways provided with transverse insulating-beams supporting the insulators and with insulating side beams supporting the ends of the transverse beams at points midway between the ends of the side beams and supports for the ends of the side beams, substantially as described.

6. A conduit for electric railways provided with transverse insulating-beams for the insulators and the insulators supported by and arranged alongside the beams, substantially as and for the purpose set forth.

7. In a conduit for electric railways, the combination of the yoke having a central post, the hand-hole casings extended from said yoke in the direction of length of the track, the insulating side beam spanning such casing, the transverse insulating-beam supported at its ends by the said side beams and the slot-plates carried by the yoke, substantially as described.

8. A conduit for electric railways having the yokes and the hand-holes adjacent thereto and provided with insulating side beams spanning such hand-holes and with the transverse insulating-beams supported at their ends by the side beams, substantially as described.

9. A conduit having lateral hand-holes and provided with the side beams spanning such hand-holes and with the transverse beams supported at their ends on the side beams midway between the ends of the latter, substantially as described.

10. The combination of the yoke having a post provided with a head undercut in its opposite sides, the slot-plates having their base-flanges engaging beneath said head and fastenings securing said plates together and in engagement with the said head, substantially as shown and described.

11. In an electric railway a trolley having its shank formed in sections one of which has a laterally-opening recess contracted toward its end and the other a portion fitted to and movable laterally into and out of the said recess and held from movement longitudinally into and out of said recess and means by which the sections are held from lateral disconnection substantially as set forth.

12. In an electric railway, a drop or underground trolley having its shank formed in sections, one section having a laterally-opening recess in which the other section fits and may be inserted and removed by a lateral movement and securing means for holding the said section in such recess, substantially as described.

13. In an electric railway, a car provided at its side with a drop or underground trolley and having a laterally-projected guard overhanging and projecting laterally over the said shank and adapted to protect the same from damage by an abutting wheel, substantially as described.

CHARLES W. JENKINS.

Witnesses:
HARRY B. OWEN,
M. A. WOODELL.